United States Patent [19]

Brown

[11] 4,314,196

[45] Feb. 2, 1982

[54] CURRENT LIMITING CIRCUIT

[75] Inventor: Leland T. Brown, Phoenix, Ariz.

[73] Assignee: Motorola Inc., Schaumburg, Ill.

[21] Appl. No.: 167,852

[22] Filed: Jul. 14, 1980

[51] Int. Cl.³ .............................................. G05F 3/20
[52] U.S. Cl. .................................................... 323/315
[58] Field of Search ............... 179/170 NC; 323/315, 323/316

[56] References Cited

U.S. PATENT DOCUMENTS

| | | | |
|---|---|---|---|
| 3,769,572 | 10/1973 | Doubt | 323/315 |
| 3,849,609 | 11/1974 | Voorman | 179/170 NC |
| 4,004,109 | 1/1977 | Boxall | 179/170 NC |
| 4,078,199 | 3/1978 | Chapron et al. | 323/315 |
| 4,093,907 | 6/1978 | Nutz | 323/315 |
| 4,100,436 | 7/1978 | Van de Plassche | 323/315 X |
| 4,203,012 | 5/1980 | Boxall | 179/170 NC |

Primary Examiner—William M. Shoop
Attorney, Agent, or Firm—Charles R. Lewis

[57] ABSTRACT

The maximum current flow in a circuit is limited to a predetermined maximum value by dividing the load current into low and high current paths with the use of interconnected current mirror circuits. By limiting the current flow in the low current path by means of a low current constant current source, the maximum value of a much larger current flow through the load is limited to a predetermined value.

17 Claims, 4 Drawing Figures

CURRENT LIMITING CIRCUIT

BACKGROUND OF THE INVENTION

This invention relates to current limiting circuits and more particularly to limiting the current in a balanced two wire bidirectional transmission path that is operatively coupled to a pair of unbalanced unidirectional transmission paths.

In many instances it is desirable to limit the amount of current that can flow through a load. An undesirable high current condition can be caused by a short circuit or by the load having a variable impedance. For example, hybrid circuits have long been used as an interface between a pair of unbalanced unidirectional transmission paths and a balanced two wire bidirectional transmission path, or loop. The hybrid circuit is usually located at a central office while the bidirectional transmission loop is coupled to a subscriber telephone. The different distances of the various subscriber telephones from the central office cause the various subscriber loops to have different impedances. Accordingly, the subscriber loops for telephones located near the control office draw more current than for those telephones located further away which results in an inefficient use of available power. Also, due to falling objects such as trees, telephone poles and the like which result in accidental severing of the subscriber loop, the subscriber loop may become shorted thereby producing undesirably high currents. This is particularly undesirable when the hybrid circuit includes an integrated circuit which is inherently a low current device. Hybrid circuits which may include integrated circuit devices are shown and described in U.S. Pat. Nos. 4,004,109 and 3,849,609 the contents of which are incorporated herein by reference.

Accordingly, one object of this invention is to provide an improved current limiting circuit.

Another object of this invention is to provide an improved current limiting circuit which allows a large current to be regulated by regulating a small current and enable the use of integrated circuits in the low current path.

Still another object of this invention is to provide a current limiting circuit for a bidirectional current loop.

A still further object of this invention is to provide a current limiting circuit for a balanced bidirectional current loop that interfaces with a pair of unbalanced unidirectional transmission paths.

SUMMARY OF THE INVENTION

Briefly described, the current limiting apparatus of the present invention includes a load having one side thereof coupled to a first terminal of a power source and the other side thereof coupled to a second terminal of the power source. First and second parallel current paths are located between the one side of the load and adjacent to the first terminal while third and fourth parallel current paths are located between the other side of the load and adjacent to the second terminal. Current mirror means are connected in the first, second, third and fourth current paths and are operable to cause the current in the second and third current paths to be substantially equal and to cause the current in the first and fourth current paths to be N times the current in the second and third current paths where N is an integral, fractional or irrational numeric quantity. Current limiting means in at least one of the second or third current paths limits the maximum current therein to a predetermined value thereby causing the current flow through said load to be limited to a predetermined maximum value.

BRIEF DESCRIPTION OF THE DRAWINGS

The above and other features, objects and characteristics of the present invention will be readily understood from the following detailed description taken in conjunction with the accompanying drawings wherein.

DESCRIPTION OF A PREFERRED EMBODIMENT

Figure 1:
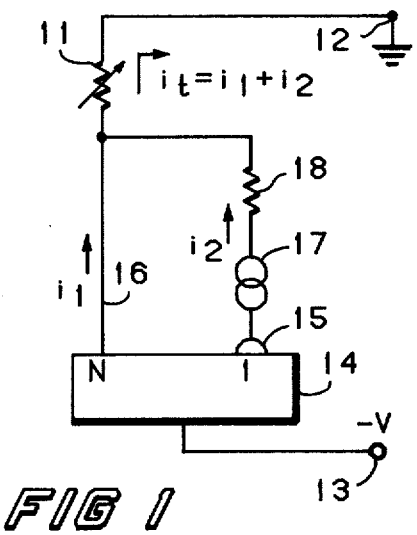
FIG. 1 is a logic and circuit diagram which illustrates the current limiting concept utilized in the present invention.

The concept utilized in the present invention will become clear by consideration of the circuit shown in FIG. 1 wherein a variable impedance load 11 has one end thereof coupled to a first terminal 12 of a power source (not shown) and the other end thereof coupled to a second terminal 13 of the power source. The terminal 12 is shown at a reference or ground potential while a negative voltage-V appears at terminal 13. Coupled between the terminal 13 and the other side of the load 11 is a current mirror circuit having its supply terminal coupled to terminal 13, its output N coupled to the other side of the load 11 by way of a first current path which includes a lead 16 and its input 15 coupled to the other side of the load 11 by way of a second current path which includes a series connected constant current source 17 and a resistance 18.

Current mirror circuits, such as current mirror circuit 14, are well known in the art and have an input terminal designated by a small semicircle, 15 as shown in FIG. 1, and one or more output terminals which may be identified by an alphanumeric character adjacent thereto, such as the N in FIG. 1. A current mirror functions in such a manner that the current present at the output terminal thereof is proportional to the input current present on the input terminal. The proportionality may be an intergal, fractional or irrational numeric quantity. For example, the current $i_1$ in FIG. 1 is N times the current $i_2$ at the input of the current source while the current through the load 11 is $i_r$ which is the sum of the two currents $i_1$ and $i_2$. Representative current mirror circuits are more completely described in U.S. Pat. No. 4,004,109.

Figure 2:
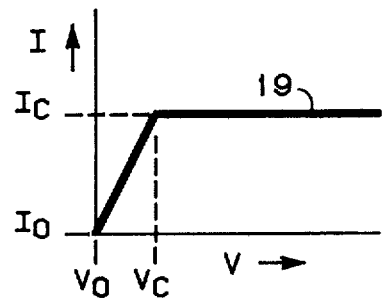
FIG. 2 is an idealized illustration of the current versus voltage characteristic of a constant current source used in the present invention.
Figure 3:
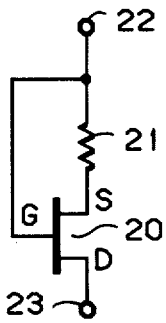
FIG. 3 is a circuit diagram of one constant current source that may be used in practicing the present invention.

The current versus voltage characteristic of a constant current source, such as device 17 in FIG. 1, is shown by the curve 19 in FIG. 2. As shown, as the voltage across the constant current source 17 increases from zero the current therethrough also increases. This continues until the magnitude of current flowing through the current source 17 reaches the maximum value which the constant current source has been designed to conduct. In FIG. 2 this occurs for a current value of Ic corresponding to a voltage value thereacross of Vc. An increase of voltage above the value of Vc across the device 17 does not produce a further increase of current through the constant current source. A well known constant current device is shown in FIG. 3 as including a FET 20 having its drain D coupled to a source 23 of operating potential, its source S coupled to another source 22 of operating potential by way of a resistor 21 and its gate G also being coupled to the operating source 22. The operation of the device is such that the maximum value of current flow therethrough is determined by the magnitude of the resistor 21. A temperature compensated FET constant current source similar to that shown in FIG. 3 is described in U.S. Pat. No. 4,053,915 the teachings of which are incorporated herein by reference.

Referring again to FIG. 1, assume that N is equal to one hundred which causes the current mirror 14 output current $i_1$ to be one hundred times greater than the input current $i_2$. As long as the magnitude of the impedance of the load 11 is large enough to keep the magnitude of input current $i_2$ to the constant current device 17 between the current values Io to Ic of the current versus voltage characteristic of the constant current device 17 as illustrated in FIG. 2, the current $i_t$ through the load 11 will be inversely proportional to the magnitude of the impedance of the load 11. However, when the impedance of the load 11 decreases to the value that causes the voltage drop across the constant current source 17 to become Vc and the current therethrough increases to Ic, the current source 17 enters into its constant current mode of operation. At this time the current $i_t$ through the load 11 has reached its maximum value. Any further decrease in the magnitude of the load 11 impedance will not result in any further increase of current $i_t$ flow therethrough. This is so because current $i_2$ cannot increase any further and neither can current $i_1$ which is one hundred times the magnitude of current $i_2$ with the sum of currents $i_1$ and $i_2$ being the total current flow $i_t$ through the load 11. Accordingly, as the impedance of the load 11 continues to decrease the voltage thereacross will continue to decrease while the voltage across the constant current source 17 increases even though the current $i_t$ therethrough remains at a value of Ic. This will continue until the impedance of load 11 becomes zero and substantially all of the source voltage-V is dropped across the constant current source 17 and resistor 18.

As will be evident from the above description, a small current flow $i_2$ through a current limiting device 17 is used to control the maximum limit of a much larger load current $i_t$. Accordingly, the current limiting device 17 may be in the form of an integrated circuit. The maximum current that can flow through the load 11 can be readily controlled by determining the maximum current flow through the constant current device 17 and selecting the proper ratio N for the current mirror circuit 14.

Figure 4:
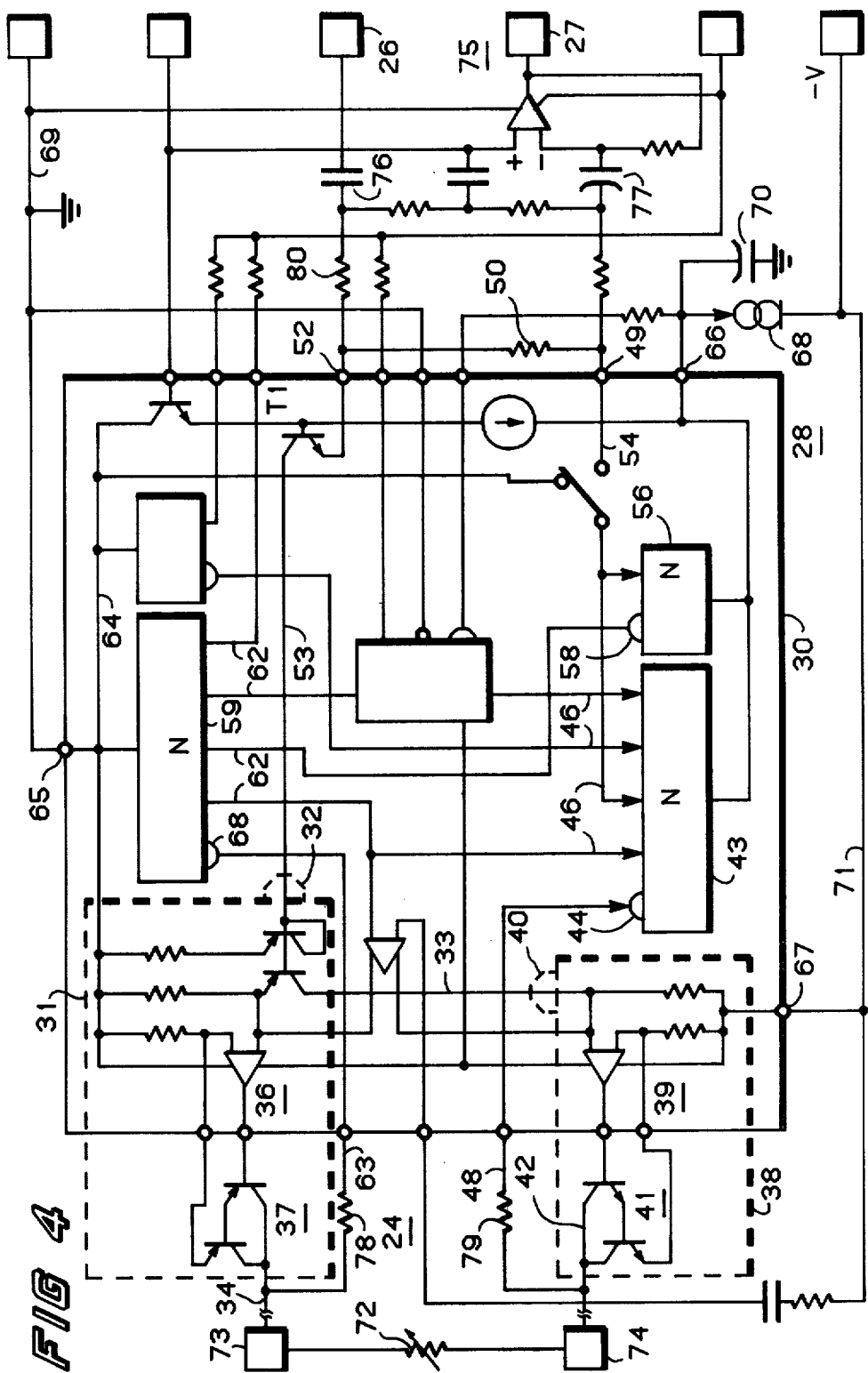
FIG. 4 is a logic and circuit diagram of a hybrid circuit that utilizes the present invention to limit the current in a bidirectional loop.

The present invention as used in a hybrid circuit 28 that interfaces a pair of unbalanced unidirectional transmission paths with a balanced two wire bidirectional transmission loop 24 is illustrated in FIG. 4. A unidirectional input signal to be coupled to the balanced bidirectional subscriber loop 24 is applied to an input terminal 26 while an output signal in the bidirectional loop 24 appears on an output unidirectional terminal 27 by way of the hybrid circuit 28. The major portion of the hybrid circuit 28 includes an integrated circuit 30. In accordance with a preferred embodiment of this invention, the integrated circuit 30 is a standard off the shelf item manufactured by Motorola Inc. and identified as a model MC3419 subscriber interface loop circuit. The chip 30 includes a first current mirror circuit 31 having an input 32, a first output on a lead 34 and a second output on a lead 33. The first current mirror circuit 31 includes an amplifier 36 on the chip itself and a power device 37 located off of the chip. A second current mirror circuit 38 has a single output coupled to a lead 42 and a single input 40 which is coupled to the second output of the first current mirror circuit 31 by way of lead 33. The second current mirror circuit 38 includes an amplifier 39 in the chip 30 and a power device 41 located off of the chip. A third current mirror circuit 43 has an input 44 which is coupled to a lead 48 and a plurality outputs 46 one of which is coupled to the input 32 of the first current mirror circuit 31 by way of a lead 54, output pin 49 on the chip 30, resistor 50, input pin 52 on the chip 30, a transistor T1 and a lead 53. A fourth current mirror circuit 56 has a single input 58 and a single output which is also coupled to the input 32 of the first current mirror circuit 31 by way of lead 54, resistor 50, transistor T1 and lead 53. A fifth current mirror circuit 59 has an input 60 coupled to a lead 63 and a plurality of outputs 62 one of which is coupled to the input 58 of the fourth current mirror circuit 43 and at least one of which is coupled to one of the outputs 46 of the third current mirror circuit 56. The supply terminals of the first 31 and fifth 59 current mirror circuits are coupled to a source of reference potential, such as ground, by way of a lead 64, a pin 65 on the chip 30 and a lead 69. The supply terminals of the second current mirror circuit 38 is coupled to source of negative potential $-V$ on a lead 71 by way of a pin 67 on the chip 30. The supply terminals of the third and fourth mirror circuits 43 and 56, respectively, are coupled to the negative potential on lead 71 by way of a pin 66 on the chip 30 and a constant current device 68. A filter capacitor 70 has one side thereof coupled to the side of the constant current source 68 adjacent to the chip 30 while the other side of the capacitor is coupled to a reference potential such as ground. The first and fifth current mirror circuits 31 and 59 respectively are of a conductivity type opposite to that of the second, third and fourth current mirror circuits 38, 43 and 56, respectively i.e. current mirror circuits 31 and 59 conduct current in a direction opposite to the direction of current flow in current mirror circuits 38, 43 and 56. The operation of the remaining components on the chip 30 are not necessary for an understanding of the present invention.

The output of the first current mirror circuit 31 on lead 34 is coupled to one side of a load 72 while the output of the second current mirror circuit 38 on lead 42 is coupled to the other side of the load 72. In accordance with the present invention the load 72 may constitute a subscriber telephone that may include ring and tip circuits 74 and 73 respectively. For purposes of describing the present invention the impedance of the load 72 is assumed to include the impedance of the loop 24 which is a function of the distance the load 72 is located from the chip 30. The voltage on the lead 34 is sensed by a resistor 78 having one end thereof connected thereto and is converted to a current that is applied to the input 60 of the fifth current mirror circuit 59 by way of lead 63 while the voltage on the lead 42 is sensed by a resistor 79 having one end thereof connected thereto and is converted to a current that is applied to the input 44 of the third current mirror circuit 43 by way of the lead 48. Current flow to the load 72 from the lead 69 is through the pin 65 and therefrom through first and second parallel current paths and then to one side of the load 72 by way of lead 34 and lead 63. The first parallel current path includes the first current mirror circuit 31 and the output thereof on lead 34 and the second parallel current path includes the fifth current mirror circuit 59, its input 60 by way of lead 63 and the sense resistor 78. Current flow from the load 72 to the negative potential $-V$ on lead 71 is by way of third and fourth parallel current paths with the third parallel current path including the sense resistor 79, lead 48 the input 44 of the third current mirror circuit 43, pin 66 on chip 30 and constant current source 68 to lead 71 whereas the fourth parallel current path includes lead 42, the second current mirror circuit 38, and pin 67 on chip 30 to lead 71. The sense resistors 78 and 79 are substantially identical and are connected to the leads 34 and 42, respectively, at a point therealong that is adjacent to the chip 30 and removed from the load 72.

Briefly described, the operation of the system illustrated in FIG. 4 is such that a unidirectional input signal on terminal 26 is coupled to the input pin 52 on chip 30 by way of a DC blocking capacitor 76 and a resistor 80 and is then applied to the input 32 of the first current mirror circuit 31 by way of transistor T1. The unidirectional input signal will result in the modulation of the current in the bidirectional loop 24 to enable the reproduction of the unidirectional input signal by the load 72. A signal generated by the load device 72 modulates the current in the chip 30 and is coupled to the unidirectional signal output terminal 27 by way of an output pin 49 on the chip 30, a DC blocking capacitor 77 and an amplifier 75. A detailed description of semiconductor hybrid circuits similar to that shown in FIG. 4 is contained in U.S. Pat. No. 4,004,109 and copending application Ser. No. 066,213 filed Aug. 13, 1979 entitled Hybrid Circuit and assigned to the assignee of this invention the teachings of which are incorporated herein by reference.

One object of this invention is to limit the maximum value of current flow through the load 72. Excessive current flow through the load 72 may result from the current load 24 being short in length i.e. the load 72 is located near the chip 20 thereby presenting a relatively low impedance, or by shorting of lead 34 to 42 caused by accidental severing of the loop 24 such as may occur when the loop 24 is severed by falling trees, falling poles or any other means. In accordance with the present invention the output of the first and second current mirror circuits 31 and 38 on leads 34 and 42 respectively is larger than the magnitude of the current applied to their inputs 32 and 40 respectively by the same proportion. In one embodiment of the Present invention which was constructed the output current from the first 31 and second 38 current mirror circuits on leads 34 and 42, respectively, was about one hundred times the value of the current input. Also, in accordance with the present invention, the value of current applied to the input 32 of the first current mirror circuit 31 is substantially equal to the value of current applied to the input 40 of the second current mirror circuit 38. Also, the value of current in lead 63 is substantially equal to the value of current in lead 48 and is the value of current that is applied to the input 32 and 40 of the first and second current mirror circuits 31 and 38 respectively. This is accomplished, in part, by causing the current supplied to the input terminal 40 of the second current mirror circuit 38 from the second output on lead 33 of the first current mirror circuit 31 to be substantially equal to the value of current in lead 48. As is well known in the art, and as discussed above, a current mirror circuit can be designed so that the value of current at an output can be any desired proportion of the value of input current. For example, the first output current from the first current mirror circuit 31 on lead 34 is about one hundred times the value of the input current at the input 32 of the first current mirror circuit 31 while the second output current on lead 33 is substantially equal to the input current. The value of the current applied to the input 32 of the first current mirror circuit 31 is equal to the value of the current in the lead 48. This is accomplished by coupling the lead 48 to the input 44 of the third current mirror circuit 43 which has one of its outputs 46 coupled to the input 32 of the first current mirror circuit 31 in a manner as discussed above. Also, as discussed above, the output of the fourth current mirror circuit 56 is applied to the input 32 of the first current mirror circuit 31. In this regard it is noted that the current applied to the input 58 of the fourth current mirror circuit is the output of the fifth current mirror circuit 59 which has its input 60 coupled to the lead 63. In one embodiment, the value of N for the output of third current mirror circuit 43 applied to the input 32 of the first current mirror circuit was one half, the value of N for the output of the fourth current mirror circuit 56 applied to the input 32 of the first current mirror circuit is one and the value of N for the output of the fifth current mirror circuit 59 applied to the input 58 of the fourth current mirror circuit was one-half.

As shown in FIG. 4, the sum of the currents drawn by the third and fourth current mirror circuits 43 and 56, respectively, flow through the constant current source 68. The value, or magnitude, of this current is much less than the magnitude of the current flowing through the load 72. As long as the current flow through the constant current device 68 is less than the constant current value (Ic in FIG. 2) the current flow through the load 72 will be inversely proportional to the magnitude of the impedance of the load. As the current through the load 72 varies due to variations of load 72 impedance, corresponding current variations occur in leads 34, 63, 48 and 42 i.e. the first, second, third and fourth current paths described hereinabove. The current in the third current Path which includes the lead 48 and the third current mirror circuit 43 input 44 also flows through the constant current source 68. Accordingly, as the current in the load 72 increases due to the impedance thereof being low, or a decreasing value, the value of the current flowing through the constant current source 68 also increases. In a manner as described hereinabove in conjunction with FIGS. 1 and 2, when the voltage drop across the constant current source 68 reaches or exceeds the constant current value (Vc in FIG. 2) the value of the current flowing through the constant current source remains at the constant current level (Ic in FIG. 2). When this occurs, the value of the current applied from the third and fourth current mirror circuits 43 and 56 respectively to the input 32 of the first current source remains constant. This also causes the value of the current applied to the input 40 of the second current mirror circuit 38 from the second output of the first current mirror circuit 31 on lead 33 to be constant. As a result, the value of the current flowing through the load 72 remains constant even though the impedance thereof continues to decrease. As the load 72 impedance continues to further decrease the voltage drop thereacross continues to decrease while the voltage drop across the constant current source 68 correspondingly increases without any change in the value of current flow through the load 72 and the constant current source 68.

As will be apparent from the above detailed description, the present invention provides a current limiting circuit which enables a large value of current to be regulated by regulating the value of a relatively small current which enables the use of integrated circuits in the low current circuit. Additionally, the above description shows that the present invention provides means for limiting the current in a balanced bidirectional current loop that interfaces with a pair of unbalanced unidirectional transmission paths.

Various changes and modifications of the invention as described will be apparent to those skilled in the art without departing from the spirit and scope of this invention as defined by the following claims.

What is claimed is:

1. Current limiting apparatus comprising:
   a load having one side thereof coupled to one terminal of a power source and the other side thereof coupled to another terminal of said power source,
   a first and a second current path located between one side of said load and the associated terminal of said power source,
   current mirror circuit means having a supply terminal coupled to said associated terminal of said power source, an input terminal coupled to said second current path and an output terminal coupled to said first current path and operable to cause the current in said first current path to be proportional to the current in said second current path, and
   current limiting means in said second current path to limit the maximum current flow therein to a predetermined maximum value.

2. The apparatus according to claim 1 wherein said load has a variable impedance.

3. The apparatus according to claim 1 wherein the current in said first current path is N times the current in said second current path where N is an integral, fractional or irrational numeric quantity.

4. The apparatus according to claim 1 wherein
   the current in said second current path is smaller in magnitude than the current in said first current path.

5. Current limiting apparatus comprising:
   a load having one side thereof coupled to a first terminal of a power source and the other side coupled to a second terminal of said power source;
   a first and a second current path located between said one side of said load and said first terminal;
   first means coupled to said first and said second current paths and operable to cause the current in said first current path to be N times the current in said second current path where N is an integral, fractional or irrational numeric quantity;
   a third and a fourth current path located between said other side of said load and said second terminal;
   second means coupled to said third and said fourth current paths and operable to cause the current in said fourth current path to be N times the current in said third current path;
   current limiting means in at least one of said second or said third current paths to limit the maximum current flow therein to a predetermined maximum value thereby causing the current flow through said load to be limited to a predetermined maximum value.

6. The apparatus according to claim 5 further including:
   means coupled between said first and second means to enable the magnitude of the current in said second current path to be substantially equal to the magnitude of the current in said third current path.

7. The apparatus according to claim 5 wherein
   said first means includes a first current mirror circuit having a supply terminal coupled to said first terminal of said power source, a first output terminal to supply current in said first current path and an input terminal having a magnitude of current supplied thereto that is substantially equal to the magnitude of current in said second or said third current path, and
   said second means includes a second current mirror having a supply terminal coupled to said second terminal of said power source, a first output terminal to supply current in said fourth current path and an input terminal having a magnitude of current supplied thereto that is substantially equal to the magnitude of current in said second or said fourth current path.

8. The apparatus according to claim 7 wherein
   said first current mirror circuit includes a second output terminal coupled to the input terminal of said second current mirror circuit to enable the input currents of said second and said first current mirror circuits to be substantially equal.

9. The apparatus according to claim 7 wherein
   said second means includes a third current mirror circuit having a supply terminal coupled to said second terminal of said power source, an output terminal coupled to the input terminal of said first current mirror circuit and an input terminal connected in said third current path.

10. The apparatus according to claim 9 wherein
    said second means includes a fourth current mirror circuit having a supply terminal coupled to said second terminal of said power source, an output terminal coupled to said input terminal of said first current mirror circuit and an input terminal, and
    said first means includes a fifth current mirror circuit having a supply terminal coupled to said first terminal of said power source, an output terminal coupled to the input terminal of said fourth current mirror circuit and an input terminal connected in said second current path.

11. The apparatus according to claim 10 wherein
    said first and fifth current mirror circuits are of one conductivity type and said second, third and fourth current mirrors are of an opposite conductivity type.

12. The apparatus according to claim 11 wherein
    said current limiting means is a constant current source coupled between the second terminal of said power source and the supply terminals of said third and fourth current mirror circuits.

13. The apparatus according to claim 5 wherein
    said load has a variable impedance.

14. The apparatus according to claim 13 wherein
    said load includes an AC and DC current path.

15. The apparatus according to claim 14 wherein
    said first and second means include a portion of a hybrid circuit that provides signal conversion between said load and a pair of unbalanced unidirectional transmission paths.

16. The apparatus according to claim 5 wherein the current in said second and said third current paths is smaller in magnitude than the current in said first and said fourth current paths.

17. Current limiting apparatus comprising:
a load,
a power source having at least first and second terminals,
first and second parallel current paths coupled between one side of said load and said first terminal,
third and fourth current paths coupled between the other side of the load and said second terminal,
current mirror means inter-connected in said first, second, third and fourth current paths and operable to cause the current in said second and third current paths to be substantially equal and the current in said first and fourth current paths to N times the current in said second or said third current path where N is an integral, fractional or irrational numeric quantity, and
current limiting means in at least one of said second or third current paths to limit the maximum current flow therein thereby limiting the current flow through said load to a predetermined maximum value.

* * * * *